United States Patent [19]

Taleyarkhan

[11] Patent Number: 4,818,478

[45] Date of Patent: Apr. 4, 1989

[54] BWR FUEL ASSEMBLY MINI-BUNDLE HAVING INTERIOR FUEL RODS OF REDUCED DIAMETER

[75] Inventor: Rusi P. Taleyarkhan, Plum Borough, Pa.

[73] Assignee: Westinghouse Electric Corp., Pittsburgh, Pa.

[21] Appl. No.: 130,034

[22] Filed: Dec. 7, 1987

[51] Int. Cl.⁴ .............................................. G21C 3/32
[52] U.S. Cl. .................................... 376/435; 376/444
[58] Field of Search ............... 376/434, 435, 439, 443, 376/444, 428, 362

[56] References Cited

U.S. PATENT DOCUMENTS

| | | | |
|---|---|---|---|
| 3,104,219 | 9/1963 | Sulzer | 204/193.2 |
| 3,318,779 | 5/1967 | Turner et al. | 176/71 |
| 3,378,457 | 4/1968 | Davidson et al. | 176/77 |
| 3,745,069 | 7/1973 | Sofer et al. | 176/78 |
| 3,802,995 | 4/1974 | Fritz et al. | 176/76 |
| 3,809,610 | 5/1974 | Smith et al. | 176/78 |
| 3,910,818 | 10/1975 | Sofer | 176/54 |
| 3,933,582 | 1/1976 | MacNabb | 176/78 |
| 4,059,484 | 11/1977 | Bopp et al. | 176/78 |
| 4,123,328 | 10/1978 | Radkowsky et al. | 176/78 |
| 4,229,258 | 10/1980 | Takeda et al. | 176/76 |
| 4,326,922 | 4/1982 | Ferrari et al. | 376/435 |
| 4,348,355 | 9/1982 | Nylund | 376/434 |
| 4,355,002 | 10/1982 | Hosokawa et al. | 376/419 |
| 4,478,786 | 10/1984 | Anderson et al. | 376/444 |
| 4,560,532 | 12/1985 | Barry et al. | 376/434 |
| 4,587,090 | 5/1986 | Mochida et al. | 376/428 |
| 4,606,880 | 8/1986 | Penkrot | 376/173 |
| 4,708,845 | 11/1987 | Mildrum | 376/435 |
| 4,749,547 | 6/1988 | Blomstrand | 376/444 |
| 4,759,912 | 7/1988 | Taleyarkhan | 376/435 |

FOREIGN PATENT DOCUMENTS

| | | |
|---|---|---|
| 2547791 | 5/1976 | Fed. Rep. of Germany . |
| 0529792 | 1/1977 | Japan . |
| 0040187 | 4/1978 | Japan . |
| 0955485 | 4/1964 | United Kingdom . |
| 2147452 | 5/1985 | United Kingdom . |

*Primary Examiner*—Donald P. Walsh

[57] ABSTRACT

A BWR fuel assembly includes an outer hollow tubular flow channel, a water cross and a plurality of mini-bundles of fuel rods. The outer channel provides an enclosure for directing the flow of coolant/moderator fluid through the fuel assembly. The water cross extends through the outer channel and has a plurality of radially extending members attached along the interior of the outer channel which divide it into a plurality of separate compartments. One mini-bundle of elongated fuel rods is located in each compartment between the interior of the outer flow channel and exterior of the radially extending members of the water cross. Each fuel rod mini-bundle is comprised of an interior array of fuel rods with each fuel rod being of a first predetermined diameter size, and a peripheral array of fuel rods with each fuel rod being of a second predetermined diameter size greater than the first diameter size. The interior array of fuel rods forms an inner, centrally-located, generally squared pattern, whereas the peripheral array of fuel rods forms an outer, peripherally-located, generally squared annular pattern which surrounds the interior array. The fuel rods in both arrays are aligned with one another in columns and rows. The fuel rods of the interior array are ten to twelve percent less in diameter size compared to the fuel rods of the peripheral array.

21 Claims, 3 Drawing Sheets

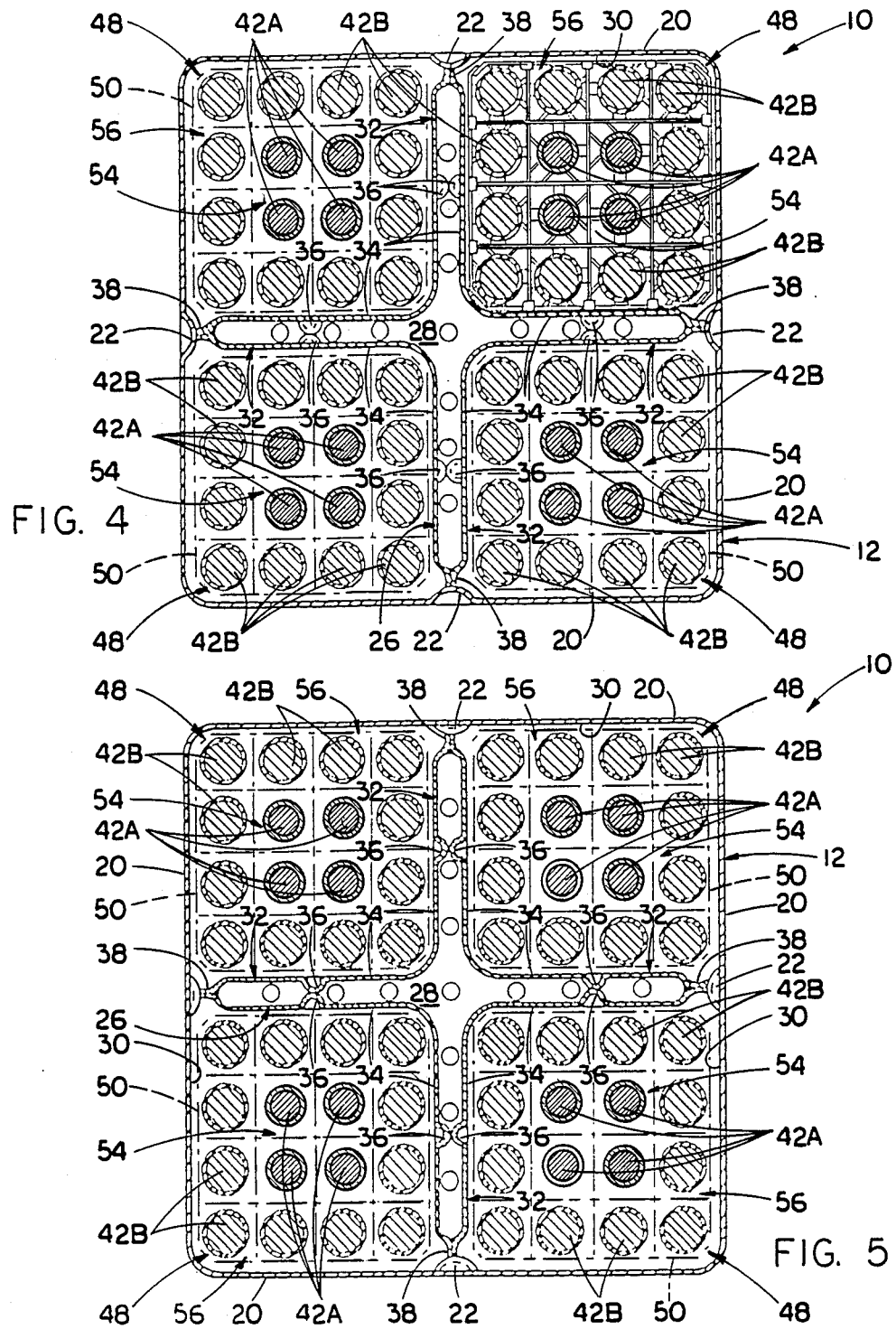

BWR FUEL ASSEMBLY MINI-BUNDLE HAVING INTERIOR FUEL RODS OF REDUCED DIAMETER

CROSS REFERENCE TO RELATED APPLICATIONS

Reference is hereby made to the following copending patent applications dealing with related subject matter and assigned to the assignee of the present invention:

1. "Improved Boiling Water Nuclear Reactor Fuel Assembly" by Rusi Taleyarkhan, assigned U.S. Ser. No. 726,602 and filed May 2, 1985.
2. "BWR Fuel Assembly With Water Flow Mixing Chamber At Fuel Bundle/Water Cross Entrance" by Rusi Taleyarkhan, assigned U.S. Ser. No. 746,619 and filed June 19, 1985.
3. "BWR Fuel Assembly With Improved Spacer and Fuel Bundle Design For Enhanced Thermal-Hydraulic Performance" by Claude M. Mildrum et al, assigned U.S. Ser. No. 852,853 and filed Apr. 16, 1986, a continuation-in-part of U.S. patent application Ser. No. 789,256, filed Oct. 18, 1985, now abandoned.
4. "BWR Fuel Assembly Having Hybrid Fuel Design" by Rusi Taleyarkhan, assigned U.S. Ser. No. 939,929 and filed Mar. 12, 1986.

BACKGROUND OF THE INVENTION

1. Field of the Invention

The present invention relates generally to nuclear reactor fuel assemblies and, more particularly, is concerned with a boiling water nuclear reactor (BWR) fuel assembly incorporating fuel rod mini-bundles having reduced diameter interior fuel rods for improved critical heat flux (CHF) performance.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces. Such BWR fuel assembly is illustrated and described in U.S. Pat. No. 4,560,532 to Barry et al.

In a fuel assembly of this type the fuel rods in the central region of the bundle thereof may be undermoderated and overenriched. In order to remedy this condition by increasing the flow of moderator water through this region of the assembly, an elongated centrally-disposed water cross is frequently used in the assembly. The central water cross has a plurality of four radial panels which together form a cruciform water flow channel which divides the fuel assembly into four, separate elongated compartments, with the bundle of fuel rods being divided into mini-bundles disposed in the respective compartments. The water cross thus provides a centrally-disposed cross-shaped path for the flow of subcooled neutron moderator water within the channel along the lengths of, but separated from, adjacent fuel rods in the mini-bundles thereof. The fuel rods of each mini-bundle extend in laterally spaced apart relationship between an upper tie plate and a lower tie plate and are connected together with the tie plate to comprise a separate fuel rod subassembly within each of the compartments of the channel. The water cross has approximately the same axial length as the fuel rod subassemblies, extending between the upper and lower tie plates thereof.

Unlike other open lattice BWR fuel assembly designs, such as illustrated and described in U.S. Pat. Nos. 3,689,358 to Smith et al and 3,802,423 to Fritz et al, the above-described BWR of the Barry et al patent incorporates twice the amount of "cold or unheated wall" surface due to the presence of the water cross. Due to this aspect more of the liquid coolant tends to accumulate or cling onto the unheated part of the fuel assembly. This results in a relative starvation of liquid coolant at the heated surfaces in the mini-bundle interior locations.

CHF problems occur when the liquid film cooling a heated surface dries up. Such a coolant flow distribution would naturally tend to degrade substantially the CHF characteristics of this BWR fuel assembly design in its interior fuel rod locations. This thermal-hydraulic effect is clearly depicted in FIG. 4.42 on page 125 of a 1977 ANS Monograph entitled "The Thermal Hydraulics of a Boiling Water Nuclear Reactor" by R. T. Lahey et al. The figure shows the relative liquid/vapor distribution within a rod bundle assembly, where flow quality contours are depicted. Note that the lower the quality, the higher the liquid content, and vice versa. The tendency of liquid to cling on the walls and vapor to accumulate in the interior is clearly seen. Such a situation would cause premature dryout (i.e., at lower bundle power levels).

In the case of this BWR fuel assembly design, this reduction amounts to about 15-20% difference in performance for the corner/side versus interior rod locations based on recently completed CHF tests. Such a drastic variation essentially reduces the bundle critical power performance by up to 20% in cases of interior peaking. Clearly, a means of minimizing or eliminating this performance degradation is necessary.

Consequently, the need exists for further improvement of the BWR fuel assembly so as to prolong its useful life by improving significantly its CHF characteristics and performance.

SUMMARY OF THE INVENTION

The present invention provides a modification which is designed to satisfy the aforementioned needs. The present invention solves the above problem by using a demonstrated thermal-hydraulic effect on CHF relating to flow area and the heated surface: the higher the flow area per heated surface, the better the heat transfer characteristics, and hence the CHF performance. This effect is applied to the water-cross BWR fuel assembly design by decreasing the fuel rod diameters for certain of the interior fuel rods in each mini-bundle relative to its peripheral fuel rods. It has been found that a reduction in rod diameter by about 10-12% leads to overall improvement in bundle critical power by about 15%. For example, in an 4×4 fuel rod mini-bundle, the four interiormost fuel rods each has the reduced diameter.

Accordingly, the present invention sets forth an improved feature in a BWR fuel assembly. The BWR fuel assembly includes an outer hollow tubular flow channel providing an enclosure for directing the flow of coolant/moderator fluid through the fuel assembly and a water cross extending through the channel and having a plurality of radially extending members attached along the interior of the channel and dividing it into a plurality of separate compartments. The improved feature resides in each mini-bundle of elongated fuel rods located in each compartment between the interior of the outer flow channel and exterior of the radially extending members of the water cross. The fuel rod mini-bundle comprises: (a) an interior array of fuel rods in the mini-bundle, each of the fuel rods in the interior array being of a first predetermined diameter size; and (b) a peripheral array of fuel rods in the mini-bundle, each of the fuel rods in the peripheral array being of a second predetermined diameter size greater than the first diameter size.

More particularly, the interior array of fuel rods forms an inner, centrally-located, generally squared pattern. The only fuel rods present in the inner squared pattern are the fuel rods of the first diameter size. The peripheral array of fuel rods forms an outer, peripherally-located, generally squared annular pattern which surrounds the interior array. The only fuel rods present in the outer squared pattern are the fuel rods of the second diameter size. The interior and peripheral arrays of fuel rods together comprise a squared array in which the fuel rods of each array are aligned with one another in columns and rows. The fuel rods of the interior array preferably are ten to twelve percent less in diameter size compared to the fuel rods of the peripheral array.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is a cross-sectional view of the fuel assembly taken along line 4—4 of FIG. 1, showing the fuel rod bundle of the fuel assembly being separated into separate mini-bundles by a water cross with a grid surrounding one of the mini-bundles being shown in full, while the grids surrounding the other three mini-bundles are shown in outline form, and with each of the mini-bundles of fuel rods incorporating the improved feature of the present invention.

FIG. 5 is another cross-sectional view of the fuel assembly similar to that of FIG. 4, but taken along line 5—5 of FIG. 1.

DETAILED DESCRIPTION OF THE INVENTION

Figure 1:
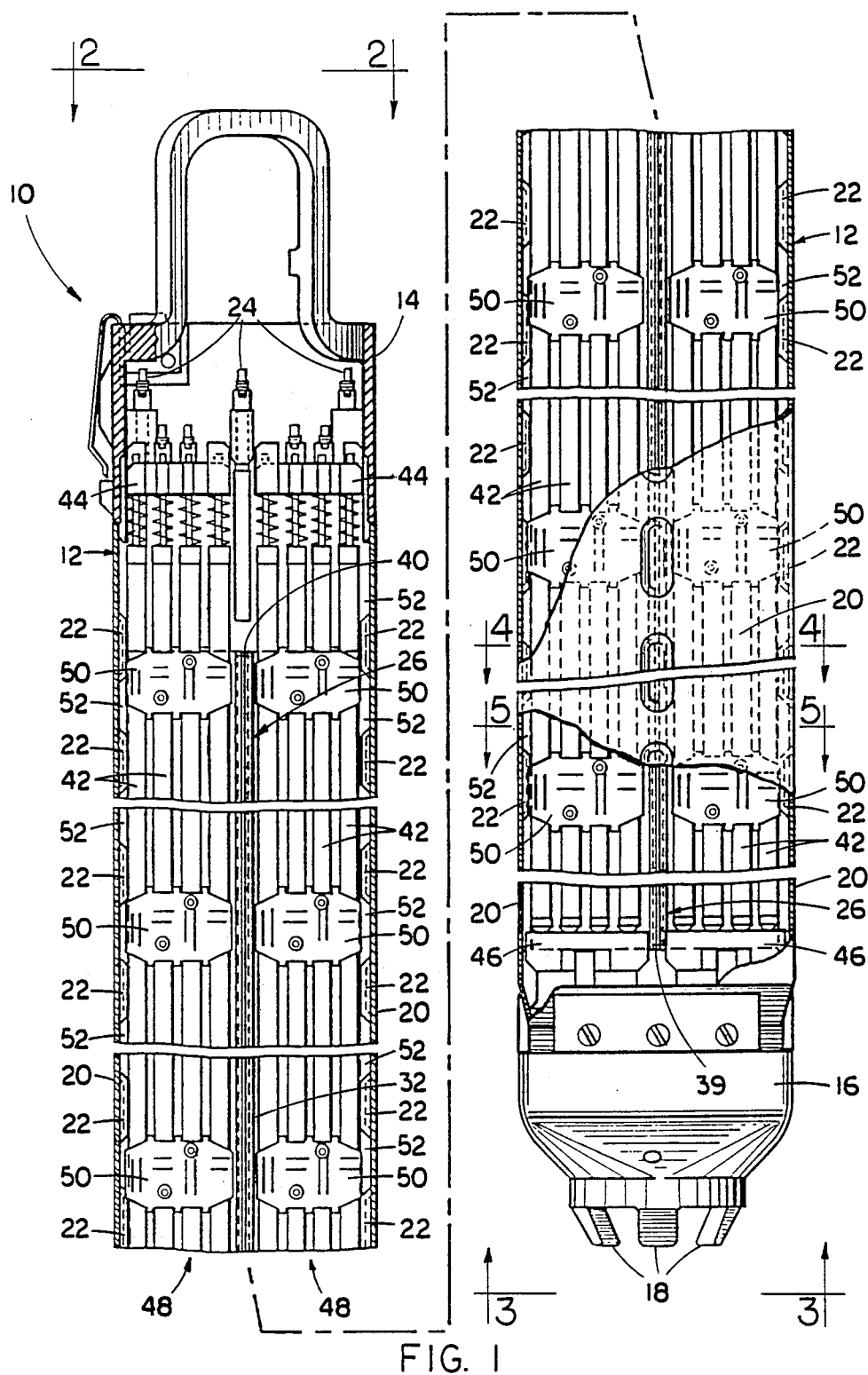
FIG. 1 is an elevational view, with parts broken away and sectioned for clarity, of a BWR nuclear fuel assembly in which the improved feature of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
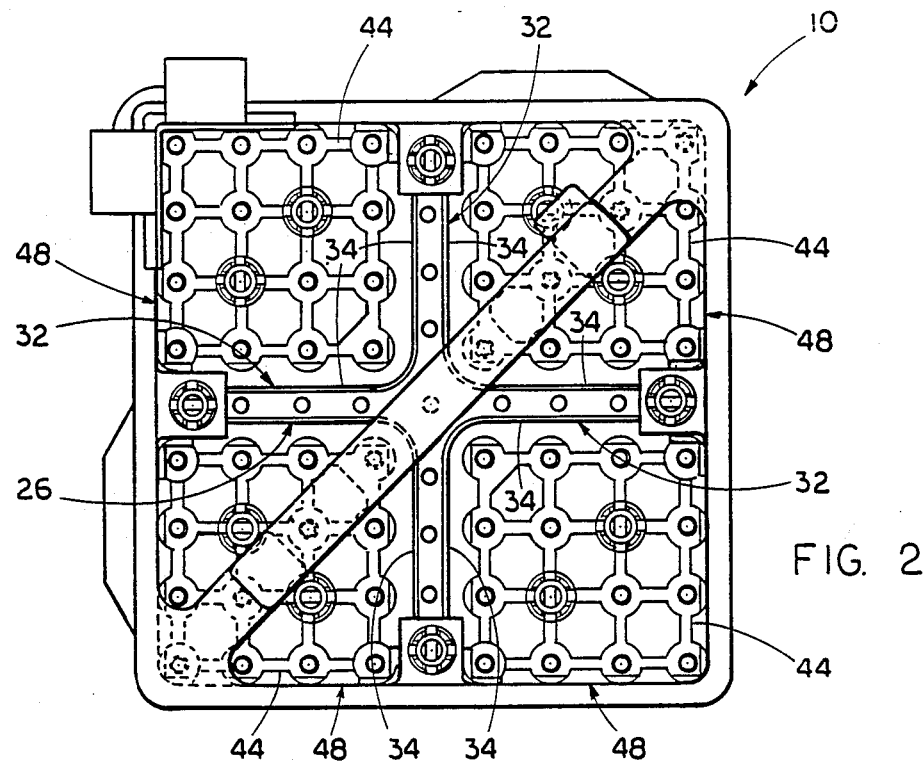
FIG. 2 is an enlarged top plan view of the fuel assembly as seen along line 2—2 of FIG. 1.
Figure 3:
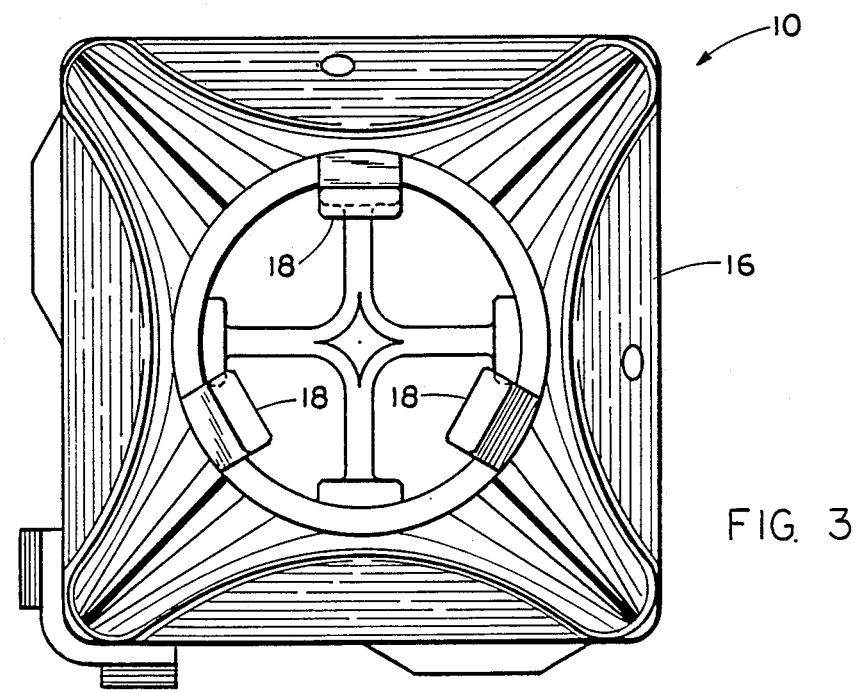
FIG. 3 is an enlarged bottom plan view of the fuel assembly as seen along line 3—3 of FIG. 1.

Referring now to the drawings, and particularly to FIGS. 1 to 3, there is shown a nuclear feel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 (also see FIGS. 4 and 5) generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, as seen in FIGS. 1, 2, 4 and 5 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channels 12 and are interconnected and spaced apart by a series of elements in the form of dimples 36 formed in the sheet members 34 of each panel 32 and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 39 and an opposite upper flow outlet end 40 which each communicate with the inner channel 28 for providing subcoolant flow therethrough.

Disposed within the channel 12 is a bundle of fuel rods 42 which, in the illustrated embodiment, number sixty-four and form an 8×8 array. The fuel rod bundle is, in turn, separated into four mini-bundles thereof by the water cross 26. Each mini-bundle incorporates the improved feature of the present invention to be described below. The fuel rods 42 of each mini-bundle, such being sixteen in number in a 4×4 array, extend in laterally spaced apart relationship between an upper tie plate 44 and a lower tie plate 46 and connected together with the tie plates comprise a separate fuel rod subassembly 48 within each of the compartments 30 of the channel 12. A plurality of grids or spacers 50 axially spaced along the fuel rods 42 of each fuel rod subassembly 48 maintain the fuel rods in their laterally spaced relationships. Coolant flow paths and cross-flow communication are provided between the fuel rod subassemblies 48 in the respective separate compartments 30 of the fuel assembly 10 by a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 48.

The above-described basic components of the BWR fuel assembly 10 are known in the prior art, except for modification of some of the fuel rods 42 so as to comprise the improved feature of the present invention, as described hereinafter. The BWR fuel assembly 10, disclosed in greater detail in the patent to Barry et al cited above, has been discussed in sufficient detail herein to enable one skilled in the art to understand the improved feature of the present invention presented hereinafter. For a more detailed description of the construction of the BWR fuel assembly, attention is directed to the above-mentioned Barry et al patent.

Interior Fuel Rods Having Reduced Diameters

The present invention provides an improved feature in each of the mini-bundles of fuel rods 42 in the form of two rod diameter sizes for interior and peripheral arrays 54,56. The fuel rods 42A in the interior array 54 thereof within each mini-bundle are of a first predetermined diameter size, whereas the fuel rods 42B in the peripheral array 56 thereof in each mini-bundle are of a second predetermined diameter size greater than the first diameter size. Preferably, the fuel rods 42A of the interior array 54 are ten to twelve percent less in diameter size compared to the fuel rods 42B of the peripheral array 56.

Furthermore, the interior and peripheral arrays 54,56 of fuel rods 42 compose an overall squared array of fuel rods. The fuel rods 42A of the interior array 54 form an inner, centrally-located, generally squared pattern, and in the 4×4 pattern of each mini-bundle amount to four in number. The only fuel rods present in the inner squared pattern are the fuel rods 42A of the first smaller diameter size. The fuel rods 42B of the peripheral array 56 form an outer, peripherally-located, generally squared annular pattern which surrounds the interior array 54, and in the 4×4 pattern of each minibundle amount to twelve in number. The only fuel rods present in the outer squared pattern are the fuel rods 42B of the second larger diameter size. Thus, the fuel rods 42A,42B of the respective interior and peripheral arrays 54,56 which together comprise an overall squared array are aligned with one another in columns and rows.

In summary, the improved feature of the present invention uses a demonstrated thermal-hydraulic effect to arrive at an unique BWR water cross-containing fuel assembly design with two rod diameter sizes, for interior and peripheral rod locations, thereby alleviating the inherent limitation on CHF performance due to additional "cold wall" surfaces. The relative rod diameter of the four interior fuel rods 42A in each mini-bundle would be set at a value of preferably about ten percent lower than the diameters of the peripheral fuel rods 42B. Experimental evidence for the W-QUAD+ critical heat flux (CHF) performance has demonstrated that the corner and side rods display vastly superior performance (more than 10–15% improvement in critical power) relative to the four interior rods. The present invention increases the flow area per rod for the interior rods thereby improving heat transfer and simultaneously reducing the power rating through smaller rods (and therefore fuel pellet) sizes. Standard nuclear design approaches would be employed to increase the enrichment of the side/corner rods so that the total fuel assembly power generated remains the same. This unique combination of factors leads to a fuel assembly with superior (approximately 10%) CHF performance, by improving the CHF performance of the interior rods to levels of the side/corner rods.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A mini-bundle of fuel rods for use in each of a plurality of separate compartments of a BWR fuel assembly, said compartments being formed by an outer hollow tubular flow channel for directing the flow of coolant/moderator fluid through the fuel assembly and a hollow water cross extending through said channel and attached along the interior of said channel so as to provide a central hollow channel for flow of coolant/moderator fluid through the fuel assembly and to divide said outer channel into said separate compartments, said mini-bundle of fuel rods comprising:
   (a) an interior array of fuel rods in said mini-bundle thereof, each of said fuel rods in said interior array being of a first predetermined diameter size; and
   (b) a peripheral array of fuel rods in said mini-bundle thereof, each of said fuel rods in said peripheral array being of a second predetermined diameter size greater than said first diameter size.

2. The fuel rod mini-bundle as recited in claim 1, wherein said interior array of fuel rods forms an inner, centrally-located, generally squared pattern.

3. The fuel rod mini-bundle as recited in claim 2, wherein the only fuel rods present in said inner squared pattern are said fuel rods of said first diameter size.

4. The fuel rod mini-bundle as recited in claim 1, wherein said peripheral array of fuel rods forms an outer, peripherally-located, generally squared annular pattern which surrounds said interior array.

5. The fuel rod mini-bundle as recited in claim 4, wherein the only fuel rods present in said outer squared pattern are said fuel rods of said second diameter size.

6. The fuel rod mini-bundle as recited in claim 1, wherein said interior and peripheral arrays of fuel rods together comprise a squared array in which said fuel rods of each array are aligned with one another in columns and rows.

7. The fuel rod mini-bundle as recited in claim 1, wherein said fuel rods of said interior array are ten to twelve percent less in diameter size compared to said fuel rods of said peripheral array.

8. In a nuclear fuel assembly including an outer hollow tubular flow channel providing an enclosure for directing the flow of coolant/moderator fluid through the fuel assembly and a water cross extending through said channel and having a plurality of radially extending members attached along the interior of said channel and dividing it into a plurality of separate compartments, a mini-bundle of elongated fuel rods located in each compartment between the interior of said outer flow channel and exterior of said radially extending members of said water cross, said fuel rod mini-bundle comprising:
   (a) an interior array of fuel rods in said mini-bundle, each of said fuel rods in said interior array thereof being of a first predetermined diameter size; and
   (b) a peripheral array of fuel rods in said mini-bundle, each of said fuel rods in said peripheral array thereof being of a second predetermined diameter size greater than said first diameter size.

9. The fuel assembly as recited in claim 8, wherein said interior array of fuel rods forms an inner, centrally-located, generally squared pattern.

10. The fuel assembly as recited in claim 9, wherein the only fuel rods present in said inner squared pattern are said fuel rods of said first diameter size.

11. The fuel assembly as recited in claim 8, wherein said peripheral array of fuel rods forms an outer, peripherally-located, generally squared annular pattern which surrounds said interior array.

12. The fuel assembly as recited in claim 11, wherein the only fuel rods present in said outer squared pattern are said fuel rods of said second diameter size.

13. The fuel assembly as recited in claim 8, wherein said interior and peripheral arrays of fuel rods together comprise a squared array in which said fuel rods of each array are aligned with one another in columns and rows.

14. The fuel assembly as recited in claim 8, wherein said fuel rods of said interior array are ten to twelve percent less in diameter size compared to said fuel rods of said peripheral array.

15. In a fuel assembly, the combination comprising:
   (a) a bundle of spaced fuel rods;
   (b) an outer hollow tubular flow channel surrounding said fuel rods so as to direct flow of coolant/moderator fluid therealong; and
   (c) a water cross extending through said channel and having a plurality of radially extending panels dividing said bundle of fuel rods into a plurality of separate fuel rod mini-bundles;
   (d) each of said fuel rod mini-bundles having an interior array of fuel rods of a first predetermined diameter size;
   (e) each of said fuel rod mini-bundles having a peripheral array of fuel rods of a second predetermined diameter size greater than said first diameter size.

16. The fuel assembly as recited in claim 15, wherein said interior array of fuel rods forms an inner, centrally-located, generally squared pattern.

17. The fuel assembly as recited in claim 16, wherein the only fuel rods present in said inner squared pattern are said fuel rods of said first diameter size.

18. The fuel assembly as recited in claim 15, wherein said peripheral array of fuel rods forms an outer, peripherally-located, generally squared annular pattern which surrounds said interior array.

19. The fuel assembly as recited in claim 18, wherein the only fuel rods present in said outer squared pattern are said fuel rods of said second diameter size.

20. The fuel assembly as recited in claim 15, wherein said interior and peripheral arrays of fuel rods together comprise a squared array in which said fuel rods of each array are aligned with one another in columns and rows.

21. The fuel assembly as recited in claim 15, wherein said fuel rods of said interior array are ten to twelve percent less in diameter size compared to said fuel rods of said peripheral array.

* * * * *